United States Patent
Behmenburg et al.

(10) Patent No.: US 6,332,623 B1
(45) Date of Patent: *Dec. 25, 2001

(54) LEVEL ADJUSTMENT DEVICE FOR VEHICLES WITH AIR SPRINGS

(75) Inventors: Christof Behmenburg, Lauenau; Helge Westerkamp, Hannover, both of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/366,953

(22) Filed: Aug. 4, 1999

(30) Foreign Application Priority Data

Aug. 6, 1998 (DE) .............................. 198 35 491

(51) Int. Cl.$^7$ .............................. B60G 11/26; B60G 9/04; F16F 9/43
(52) U.S. Cl. .............................. 280/124.16; 280/124.157; 280/5.514; 280/6.15; 280/707; 280/711; 280/840; 267/64.28; 267/64.11
(58) Field of Search ................... 280/707, 702, 280/711, 840, 124.16, 124.157, 6.157, 6.15, 6.159, 5.514; 267/64.28, 64.11

(56) References Cited

U.S. PATENT DOCUMENTS

| 3,680,283 | * | 8/1972 | Jones, Jr. | ................. | 55/309 |
| 4,756,548 | * | 7/1988 | Kaltenthaler et al. | ............... | 280/702 |
| 4,809,957 | * | 3/1989 | Schonfeld et al. | ................. | 267/64.11 |

(List continued on next page.)

FOREIGN PATENT DOCUMENTS

| 3028472 | 2/1982 | (DE) . |
| 35 42 975 | 6/1987 | (DE) . |
| 19528852 | 2/1997 | (DE) . |

(List continued on next page.)

OTHER PUBLICATIONS

Pneumatic Controls Introduction and Fundamentals of Pneumatic Controls, 10$^{th}$ Edition 1994, Vogel Buchverlag, Werner Deppert et al., pp. 142–143.

*Primary Examiner*—Lanna Mai
*Assistant Examiner*—Paul Royal, Jr.
(74) *Attorney, Agent, or Firm*—Smith, Gambrell & Russell, LLP

(57) ABSTRACT

Level adjustment device for vehicles with air springs 8a through 8d, by which a vehicle body is furnished with suspension on at least one vehicle axle, which includes the following:

a source of compressed air 2, which, for the purpose of filling air springs 8a through 8d, can be connected to air springs 8a through 8d via an air dryer 4, the air dryer 4, for the purpose of filling the air springs, is connected on one side to air springs 8a through 8d through a check valve 6 that is open to air springs 8a through 8d, each air spring 8a through 8d, for the purpose of emptying them, can be connected through the air dryer 4 and through a pneumatically controlled first distribution valve 10 to the atmosphere, wherein the pneumatic control input 38 of this distribution valve 10 is then impinged through a second controllable distribution valve 12 with the pressure in air springs 8a through 8d against a restoring force 50 acting on the pneumatic control input 38, the pneumatic control input 38 of the pneumatically controlled first distribution valve 10, for the purpose of ending the emptying process, can be connected to the atmosphere, wherein the air dryer 4 is connected on the other side to air springs 8a through 8d through a pneumatically controlled third distribution valve 14, wherein the pneumatic control input 44 of this distribution valve is then impinged with the pressure of air springs 8a through 8d against a restoring force 52 acting on the pneumatic control input 44.

22 Claims, 2 Drawing Sheets

U.S. PATENT DOCUMENTS

| | | | | |
|---|---|---|---|---|
| 5,452,919 | * | 9/1995 | Hoyle et al. | 280/840 |
| 5,466,007 | * | 11/1995 | Smith | 280/840 |
| 6,098,967 | * | 8/2000 | Flochert | 267/64.16 |
| 6,116,586 | * | 9/2000 | Westerkamp et al. | 267/64.28 |

FOREIGN PATENT DOCUMENTS

| | | |
|---|---|---|
| 496958 | 8/1992 | (EP) . |
| 9305972 | 4/1993 | (WO) . |

\* cited by examiner

LEVEL ADJUSTMENT DEVICE FOR VEHICLES WITH AIR SPRINGS

INTRODUCTION AND BACKGROUND

The present invention relates to a level adjustment device for vehicles with a plurality of air springs, by which a vehicle body is furnished with suspension on at least one vehicle axle, which has the following characteristics:

- a source of compressed air, which, for the purpose of filling the air springs, can be connected to the air springs via an air dryer;
- the air dryer, for the purpose of filling the air springs, is connected on one side to the air, springs through a check valve that is open to the air springs;
- each air spring, for the purpose of emptying them, can be connected through the air dryer and through a pneumatically controlled first distribution valve to the atmosphere, wherein the pneumatic control input of his distribution valve is then impinged through a second distribution valve with the pressure in the air springs against a restoring force acting on the pneumatic control input;
- the pneumatic control input of the pneumatically controlled first distribution valve, for the purpose of ending the emptying process, can be connected to the atmosphere.

A level adjustment device of the type mentioned in the introduction is known from German patent document DE 35 42 975 C2. The level adjustment device known from this publication can be characterized as advantageous in the respect that the distribution valve through which the air escapes into the atmosphere through the air dryer for the purpose of emptying the air springs is configured as a pneumatically controlled distribution valve. Consequently, high switching forces can be exerted on this distribution valve and great flow cross-sections can be engaged using the compressed air in the air springs. If by chance the distribution valve ices up as a consequence of moisture in the air at low temperatures, the switching of the distribution valve is nevertheless possible. With the level adjustment device known from DE 35 42 975 C2, it is further seen as advantageous that in their normal condition (i.e. when the air springs are neither filled up nor empty) the air springs are separated from the air dryer on one side by a check valve open to the air springs and on the other side by an electrically controlled distribution valve, so then no air can flow from the air springs to the air dryer. Consequently, it is possible to arrange between the air springs and the air dryer a pressure sensor to which each air spring can be connected to measure pressure without the possibility of air flowing out of the air springs into the air dryer. This would lead to an undesirable loss, in pressure in the air springs.

However, it must be stated with the level adjustment device known from German patent document DE 35 42 975 C2 that, in emptying an air spring, the air is routed through the electrically controlled distribution valve, which, in the normal condition, separates the air springs from the air dryer. Since with electrically controlled distribution valves only small flow cross-sections can be engaged at a justifiable expense, a rapid emptying of the air springs, and a correspondingly rapid lowering of the vehicle (e.g. with the vehicle parked) is therefore not possible.

It is therefore an object of the invention to produce a level adjustment device in which the air springs are completely separated from the air dryer in the normal condition and in which a rapid emptying of the air springs is possible.

SUMMARY OF THE INVENTION

The above and other objects of the present invnetion can be achieved by a device described herein which features an air dryer connected on the other side to the air springs through a pneumatically controlled third distribution valve, wherein the pneumatic control input of this distribution valve is then impinged upon with the pressure in the air spring against a restoring force acting on the pneumatic control input.

The advantages achieved with the invention are to be seen in particular in the fact that the air springs are emptied through a pneumatically controlled distribution valve arranged between the air springs and the air dryer to which large flow cross-sections can be conducted. Because of this, a rapid emptying of the air springs is possible. Furthermore, in the normal condition of the level adjustment device, the air springs are completely separated from the air dryer. Consequently, by using a pressure gauge it is possible to measure the air pressure without a volume of air flowing from the air springs into the air dryer, thus leading to an undesirable loss in pressure in the air springs.

A further advantage of the invention is to be seen in the fact that, during the emptying, of an air spring, air does not continually flow through the second controllable distribution valve. Therefore, losses in air pressure at this valve do not result. Consequently, the full static air pressure of the air springs is present at the control input of the pneumatically controlled first distribution valve, so that high switching forces can be generated there. By contrast, with the level adjustment device known from DE 35 42 975 C2, during the emptying of an air spring, air continually flows through the second controllable distribution valve. This is because, on one side, the control input of the pneumatically controlled first distribution valve is controlled by this second distribution valve, and, on the other side, the air from the air spring flows into the air dryer; for this reason a continual loss in pressure in the static air pressure results, so that the full air pressure is not applied at the control input of the pneumatically controlled first distribution valve.

According to another configuration of the invention, the pneumatic control input of the first control valve can be connected to the atmosphere through the second controlled distribution valve for the purpose of ending an emptying process. The advantage of this additional configuration is to be seen in the fact that no separate valve needs to be provided for venting the control input of the first distribution valve into the atmosphere. Furthermore, this function is integrated into the second distribution valve.

According to another configuration of the invention, the pneumatic control input of the third control valve is impinged with the pressure in the air spring through the second controlled distribution valve for the purpose of emptying the air spring. The advantage of this additional configuration is to be seen in the fact that no separate valve needs to be provided through which the pneumatic control input of the third distribution valve is impinged with the pressure in the air spring during the emptying of the air spring.

According to another configuration of the invention, the pneumatic control input of the pneumatically controlled third distribution valve can be connected to the atmosphere after an emptying process. The advantage of this additional configuration can be seen in the fact that the pneumatically controlled third distribution valve can be set back into the switching condition in which it blocks the route from the air spring to the air dryer by routing the control input to the atmosphere (i.e. in the normal condition).

According to another configuration of the invention, the pneumatic control input of the pneumatically controlled third distribution valve can be blocked from the atmosphere by the second controllable distribution valve. The advantage of this additional configuration is to be seen in the fact that the pneumatic control inputs of the first and third distribution valve can be blocked from the atmosphere by the same distribution valve and as a result less distribution valves are needed, with resulting cost savings.

According to another configuration of the invention, the pneumatically controlled first distribution valve and the pneumatically controlled third distribution valve are brought together into one pneumatically controlled distribution valve. The advantage of this additional configuration is to be seen in the fact that two separate pneumatically controlled distribution valves do not have to be provided, with resulting cost savings.

According to another configuration of the invention, the second controllable distribution valve is electrically controlled. The advantage of this additional configuration is to be seen in the fact that the level adjustment device can be switched into a different switching condition in which it is possible to empty the air spring.

BRIEF DESCRIPTION OF DRAWINGS

The invention will be further explained with reference to the accompanying drawings, wherein.

DETAILED DESCRIPTION OF INVENTION

The present invention will now be described in further detail.

Figure 1:
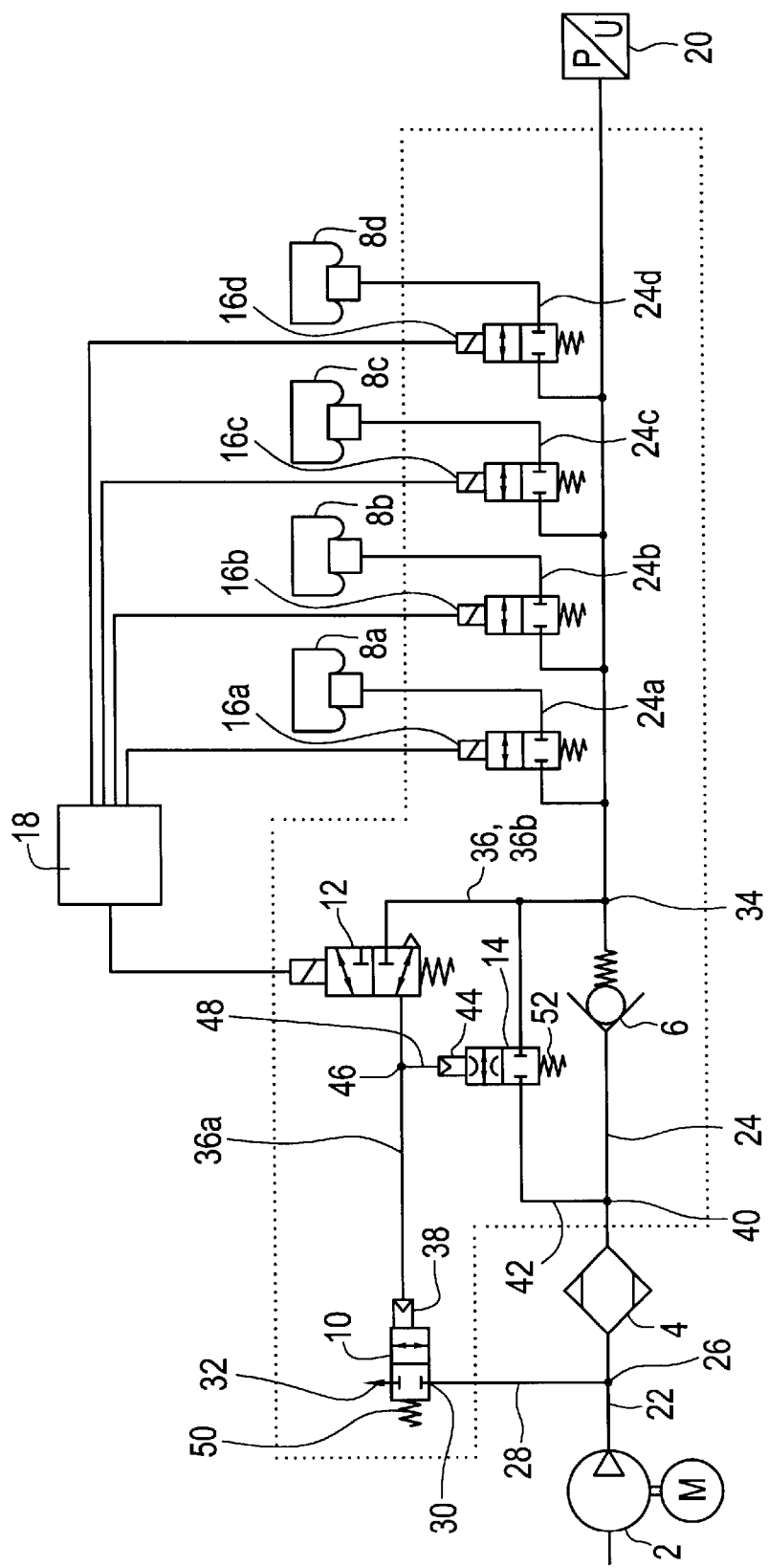
FIG. 1 is a schematic diagram of the level adjustment device according to the present invention.

FIG. 1 shows a level adjustment device in schematic representation, wherein only the components necessary for the explanations below are shown. The level adjustment device includes a source for compressed air in the form of a compressor 2, which is connected by a pressure line 22 to the intake of an air dryer 4. On the output side, the air dryer 4 is connected by a pressure line 24 to check valve 6, and to pneumatic control input 44. Check valve 6 is connected, inter alia, to distribution valves 16a–16d, which in turn are connected to air springs 8a through 8d. A check valve 6 opening to air springs 8a through 8d is situated in pressure line 24. Past the check valve 6 (seen from the air dryer out) pressure lines 24a through 24d branch off from pressure line 24, each of which leads to one of the distribution valves 16a–16d and then lead to the air springs 8a through 8d. Each of the pressure lines 24a through 24d includes an electrically controlled 2/2 distribution valve 16a through 16d, with which pressure lines 24a through 24d can be blocked or routed through. The pressure line 24 past the check valve 6 (seen from the air dryer 4 out) is also connected to a pressure sensor 20, whose function is explained later.

Between the compressor 2 and the air dryer 4 at branch point 26 a pressure line 28 branches off, being routed to the first connection 30 of the pneumatically controlled 2/2 distribution valve 10. The second connection 32 of the pneumatically controlled distribution valve 10 is connected to the atmosphere. In an initial switching condition of the pneumatically controlled distribution valve 10, pressure line 28 is blocked off from the atmosphere, whereas in the second switching condition of the pneumatically controlled distribution valve 10, pressure line 28 is connected to the atmosphere. The significance of the individual switching conditions is explained in greater detail below.

Between the check valve 6 and air springs 8a through 8d at a branch point 34, pressure line 36 branches off from pressure line 24. The electrically controlled 3/2 distribution valve 12, through which pressure line 36 is connected to the pneumatic control input 38 of the pneumatically controlled first distribution valve 10, is situated in pressure line 36. In the first switching condition of the electrically controlled control valve 12, part 36a of pressure line 36, which leads from distribution valve 12 to the pneumatic control input 38, is connected to the atmosphere and the second part 36b of pressure line 36, which leads from pressure line 24 to distribution valve 12, is blocked from the atmosphere. In the second switching condition of distribution valve 12, pressure line 36 is routed through so that pressure line 24, starting front branch point 34, is connected to the pneumatic control input 38 of the pneumatically controlled distribution valve 10. The function of the switching conditions is likewise explained in greater detail below.

Between the air dryer 4 and the check valve 6 at a branch point 40, a pressure line 42 branches off from pressure line 24. Between the check valve 6 and air springs 8a through 8d, pressure line 42 is routed back to pressure line 24. Preferably, this happens by virtue of the fact that pressure line 42 is connected to part 36b of pressure line 36, which connects pressure line 24 coming from branch point 34 to distribution valve 12.

In pressure line 42 is located a pneumatically controlled 2/2 distribution valve 14, which closes pressure line 42 in a first switching condition and opens pressure line 42 in a second switching condition. The pneumatic control input 44 is impinged with the air pressure in air springs 8a–8d to switch over distribution valve 14, which can occur in whichever way is desired. Preferably, however, the air pressure in one of the air springs 8a through 8d is applied through distribution valve 16a through 16d and distribution valve 12 to the control input 44. To make this happen, a pressure line 48, which leads to the pneumatic control input 44, branches off from part 36a of pressure line 36 at branch point 46. The function of the switching conditions is likewise explained in greater detail below.

FIG. 1 shows the level adjustment device in the normal condition, in which neither filling or emptying of air springs 8a through 8d is possible and air springs 8a though 8d are blocked off from the air dryer 4. Explained below is how air spring 8a, for example, can be filled with air: First a signal is emitted from the control device 18 to the control input of the electrically controlled distribution valve 16a, so that it switches from the normal condition shown in FIG. 1 (first switching condition) to the second switching condition. Pressure line 24a is then routed through. As a result, the compressor 2 is activated by the control device so that it sends air through the air dryer 4, the check valve 6 and distribution valve 16a into air spring 8a. If the filling of air spring 8a is terminated, then distribution valve 16a is closed by the control device 18 so that it is switched from the second switching condition back into the normal condition shown in FIG. 1. Furthermore, the compressor 2 is activated by the control device 18 so that it stops running. Filling air springs 8b through 8d occurs in an analogous way. It is thus indicated that in filling one of the air springs 8a through 8d, the controllable distribution valves 10, 12 and 14 maintain the normal condition (first switching condition) shown in FIG. 1.

It is explained below how one of the air springs 8a through 8d, for example air spring 8a, is emptied: First, a signal is emitted by the control device 18 to the control input of distribution valve 16a and to the control input of distribution valve 12 so that they switch from the normal condition shown in FIG. 1 (first switching condition) into the second switching condition. Pressure lines 24a and 36 are then "routed through". The air pressure prevailing in air spring 8a is then applied through pressure lines 24a, 24 and 36 to the control input 38 of the pneumatically controlled distribution valve 10. This is then switched against the force of the pull-back spring 50 from the normal condition shown in FIG. 1 (first switching condition) into the second switching condition. Furthermore, the air pressure prevailing in air spring 8a is applied to the pneumatic control input of the pneumatically controlled distribution valve 14 through pressure lines 24a, 24, 36 and 48, so that it switches from the normal condition shown in FIG. 1 (first switching condition) into the second switching condition. The air spring is then emptied through distribution valve 16a, distribution valve 14, the air dryer 4 and distribution valve 10 into the atmosphere.

If the emptying process is ended, distribution valves 16a and 12 are then closed by the control device 18 so that they switch from the second switching condition back into the normal condition shown in FIG. 1. In this case, part 36a of control line 36 is emptied through distribution valve 12 into the atmosphere, so that atmospheric pressure is present at the pneumatic control input 38 of distribution valve 10, and, due to the restoring force of the pull-back spring 50, distribution valve 10 switches from the second switching condition back into the normal condition shown in FIG. 1. Furthermore, pressure line 48 is likewise connected to the atmosphere, so that atmospheric pressure is also present at the pneumatic control input 44 of distribution valve 14, and distribution valve 14 also switches from the second switching condition into the normal condition shown in FIG. 1 by the restoring force of the push-back spring 52. The level adjustment device is then found back in its overall normal condition shown in FIG. 1. An emptying of air springs 8b through 8d occurs analogously.

If an emptying process is not terminated by the control device 18 in the manner explained above, then the pneumatically controlled distribution valve 10 automatically switches from the second switching condition into the normal condition shown in FIG. 1, when a residual pressure is attained in air springs 8a through 8d as a consequence of the air pressure at the control input 38 of distribution valve 10. In this case, specifically distribution valve 10 is switched from the second switching condition into the normal condition by the restoring force of the pull-back spring 50 against the residual pressure acting on the control input 38. The pneumatically controlled distribution valve 10 thus assumes the function of a residual pressure stop valve. The pneumatically controlled distribution valve 14 likewise switches into the normal condition shown in FIG. 1 due to the restoring force of the push-back spring 52.

Explained below is how the air pressure can be measured in one of the air springs 8a through 8d, for example air spring 8a: For the measurement of the air pressure in air spring 8a, distribution valves 10, 12, and 14 adhere to the normal condition shown in FIG. 1. Distribution valve 16a is activated by the control device 18, so that it switches from the normal condition shown in FIG. 1 into the second switching condition. Pressure line 24a is then routed through so that the air pressure in air spring 8a through pressure lines 24a and 24 is present at the pressure gauge 20 and can be measured by it. In the measurement of air pressure in air spring 8a, no air reaches the air dryer 4, since both the check valve 6 and distribution valve 14 are blocked from the air dryer 4. For this reason, in the measurement of the air pressure of air spring 8a, no undesirable loss of air volumes in air spring 8a occurs due to a flow of air into the air dryer 4. The air pressure of air springs 8b through 8d is measured in an analogous way.

Figure 2:
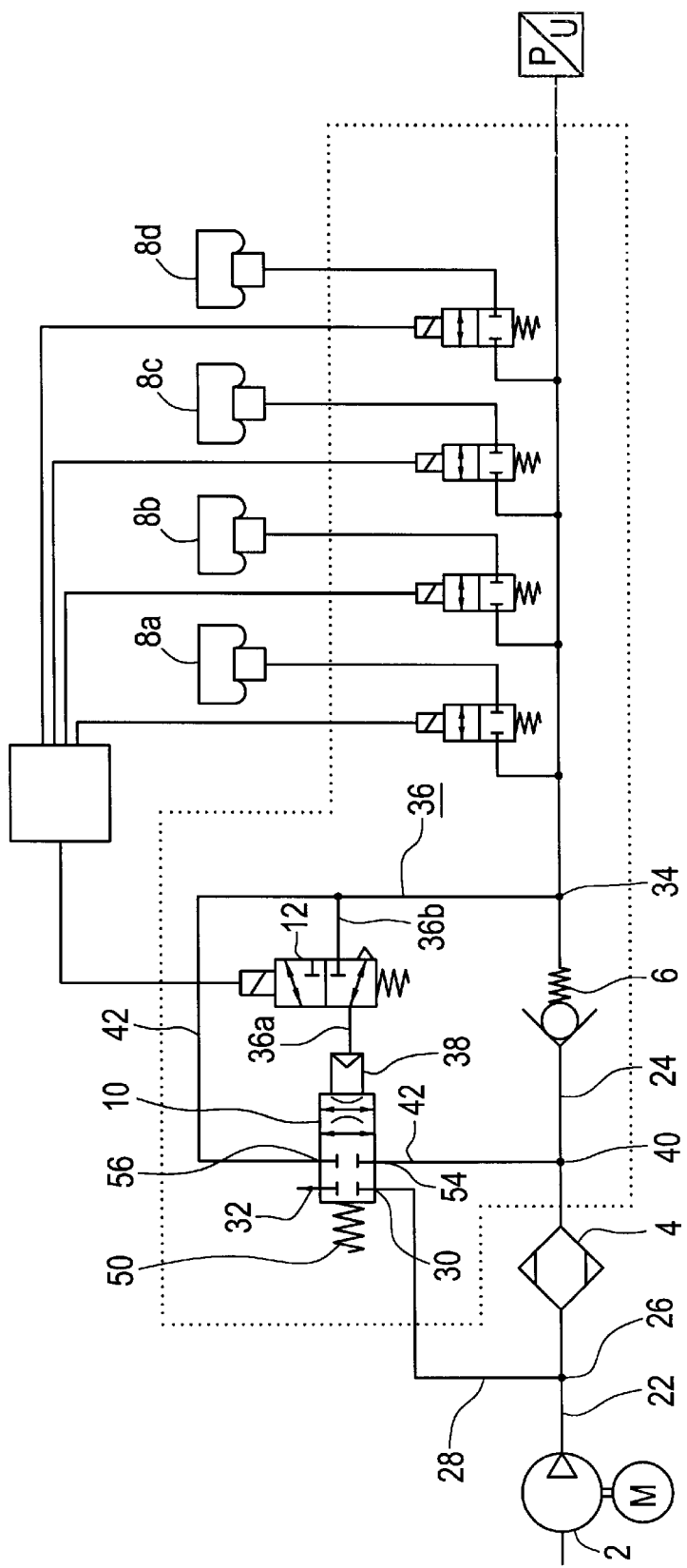
FIG. 2 is a schematic diagram of a further embodiment of a level adjustment device.

FIG. 2 shows a level adjustment device that is to a great extent configured just like the level adjustment device shown in FIG. 1. One difference can be seen merely in the fact that the pneumatically controlled 2/2 distribution valves 10 and 14 shown in FIG. 1 are combined into one pneumatically controlled 4/2 distribution valve. Pressure line 28, which can be connected to the atmosphere through the second connection 32, is routed to the first connection 30 of the 4/2 distribution valve 10. The part of pressure line 42 that branches off from branch point 40 is routed to the third connection 54 of distribution valve 10, and the part of pressure line 42 that ends at the branch point 34 between check valve 6 and air springs 8a through 8d is routed to the fourth connection 56 of distribution valve 34.

Connections 54 and 56 of distribution valve 10 in FIG. 2 correspond in this to the connections of distribution valve 14 in FIG. 1. Just as in FIG. 1, the part of pressure line 36a that connects distribution valve 12 to distribution valve 10 leads to the pneumatic control input 38 of distribution valve 10. In the normal condition of the 4/2 distribution valve 10 shown in FIG. 2 (first switching condition), pressure line 28 is blocked off from the atmosphere and pressure line 42 is closed off just as in the normal condition shown in FIG. 1). In the second switching condition of the 4/2 distribution valve, pressure line 28 is connected to the atmosphere and pressure line 42 is routed through. As for the rest, the operation of the level adjustment device shown in FIG. 2 is identical to the level adjustment device shown in FIG. 1 so that reference is made in this regard to the figure description for FIG. 1.

Further variations and modifications of the foregoing will be apparent to those skilled in the art and are intended to be encompassed by the claims appended hereto.

German priority application 198 35 491.6 filed Aug. 6, 1998 is relied on and incorporated herein by reference.

We claim:

1. A level of adjustment device for vehicles with a plurality of air springs, comprising:

a source of compressed air;

an air dryer connected to the compressed air source;

a check valve connecting said air dryer to said air springs;

a pneumatically controlled first distribution valve having
   a pneumatic control input,
   said first distribution valve connected to said air dryer, said compressed air source, the atmosphere, a second controllable distribution valve, and a pneumatically controlled third distribution valve,
   said pneumatic control input of said first distribution valve connecting said pneumatically controlled first distribution valve to said second controllable distribution valve and to a pneumatically controlled input of said pneumatically controlled third distribution valve, said second controllable distribution valve connecting said air springs to said pneumatic control input of said pneumatically controlled first distribution valve and to said pneumatic control input of said pneumatically controlled third distribution valve, whereas during air spring filling, said check valve is open connecting the compressed air source to said air springs; and whereas during air spring emptying, each air spring is connected to the atmosphere through said air dryer, through said pneumatically controlled first distribution valve, and through said pneumatically controlled third distribution valve, wherein the pneumatic control input of said first distribution valve is impinged through said second controllable distribution valve with pressure from the air springs against a restoring force acting on the pneumatic control input, and wherein the pneumatically controlled input of the a pneumatically controlled third distribution valve is impinged with the pressure of the air springs against a restoring force acting on the pneumatic control input of the pneumatically controlled third distribution valve, and to end the air spring emptying process, the pneumatic control input of said pneumatically controlled first distribution valve is connected to the atmosphere through said second controlled distribution valve.

2. The level adjustment device according to claim 1, wherein the pneumatic control input of the first distribution valve, for the purpose of ending an emptying process, can be connected through the second controllable distribution valve to the atmosphere.

3. The level adjustment device according to claim 2, wherein the pneumatic control input of the third control valve, for the purpose of emptying the air springs, can be impinged through the second controllable distribution valve with the pressure in the air springs.

4. The level adjustment device according to claim 3, wherein the pneumatically controlled first distribution valve and the pneumatically controlled third distribution valve are combined into one pneumatically controlled distribution valve.

5. The level adjustment device according to claim 3, wherein the second controllable distribution valve is electrically controlled.

6. The level adjustment device according to claim 2, wherein the pneumatic control input of the pneumatically controlled third distribution valve can be connected to the atmosphere.

7. The level adjustment device according to claim 6, wherein the second controllable distribution valve is electrically controlled.

8. The level adjustment device according to claim 2, wherein the pneumatic control input of the pneumatically controlled third distribution valve can be connected through the second controllable distribution valve to the atmosphere.

9. The level adjustment device according to claim 2, wherein the pneumatically controlled first distribution valve and the pneumatically controlled third distribution valve are combined into one pneumatically controlled distribution valve.

10. The level adjustment device according to claim 2, wherein the second controllable distribution valve is electrically controlled.

11. The level adjustment device according to claim 1, wherein the pneumatic control input of the third control valve, for the purpose of emptying the air springs, can be impinged through the second controllable distribution valve with the pressure in the air springs.

12. The level adjustment device according to claim 11, wherein the pneumatic control input of the pneumatically controlled third distribution valve can be connected to the atmosphere.

13. The level adjustment device according to claim 11, wherein the pneumatic control input of the pneumatically controlled third distribution valve can be connected through the second controllable distribution valve to the atmosphere.

14. The level adjustment device according to claim 11, wherein the pneumatically controlled first distribution valve and the pneumatically controlled third distribution valve are combined into one pneumatically controlled distribution valve.

15. The level adjustment device according to claim 11, wherein the second controllable distribution valve is electrically controlled.

16. The level adjustment device according to claim 1, wherein the pneumatic control input of the pneumatically controlled third distribution valve can be connected to the atmosphere.

17. The level adjustment device according to claim 16, wherein the pneumatic control input of the pneumatically controlled third distribution valve can be connected through the second controllable distribution valve to the atmosphere.

18. The level adjustment device according to claim 16, wherein the pneumatically controlled first distribution valve and the pneumatically controlled third distribution valve are combined into one pneumatically controlled distribution valve.

19. The level adjustment device according to claim 16, wherein the second controllable distribution valve is electrically controlled.

20. The level adjustment device according to claim 1, wherein the pneumatic control input of the pneumatically controlled third distribution valve can be connected through the second controllable distribution valve to the atmosphere.

21. The level adjustment device according to claim 1, wherein the pneumatically controlled first distribution valve and the pneumatically controlled third distribution valve are combined into one pneumatically controlled distribution valve.

22. The level adjustment device according to claim 1, wherein the second controllable distribution valve is electrically controlled.

* * * * *